United States Patent
Poisner et al.

(10) Patent No.: US 9,630,589 B2
(45) Date of Patent: Apr. 25, 2017

(54) IMPAIRMENT RECOGNITION MECHANISM

(71) Applicant: Intel Corporation, Santa Clara, CA (US)

(72) Inventors: David I. Poisner, Carmichael, CA (US); Yuri Krimon, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 14/669,826

(22) Filed: Mar. 26, 2015

(65) Prior Publication Data

US 2016/0280181 A1    Sep. 29, 2016

(51) Int. Cl.
    G08B 23/00    (2006.01)
    B60R 25/00    (2013.01)
    B60Q 9/00     (2006.01)

(52) U.S. Cl.
    CPC ............... B60R 25/00 (2013.01); B60Q 9/00 (2013.01)

(58) Field of Classification Search
    CPC .................................. B60R 25/00; B60Q 9/00
    USPC .............................................. 340/573.1, 576
    See application file for complete search history.

(56) References Cited

U.S. PATENT DOCUMENTS

| | | | |
|---|---|---|---|
| 8,981,942 B2 | 3/2015 | He et al. | |
| 2004/0239510 A1* | 12/2004 | Karsten | B60K 28/063 340/576 |
| 2011/0304465 A1* | 12/2011 | Boult | B60K 28/06 340/576 |
| 2013/0038437 A1 | 2/2013 | Talati et al. | |
| 2014/0139655 A1 | 5/2014 | Mimar | |
| 2014/0333747 A1 | 11/2014 | Mader et al. | |

OTHER PUBLICATIONS

PCT Search Report and Written Opinion, PCT/US2016/017184, May 18, 2016, 13 pages.

* cited by examiner

*Primary Examiner* — Ojiako Nwugo
(74) *Attorney, Agent, or Firm* — Blakely, Sokoloff, Taylor & Zafman LLP

(57) ABSTRACT

A method is described including receiving sensory data, determining an indication of initial user impairment based on the sensory data, providing one or more games to the user to determine a level of user impairment, calculating a game score based on user responses to the one or more games and providing an indication of impairment upon a determination that the game score indicates user impairment.

21 Claims, 4 Drawing Sheets

IMPAIRMENT RECOGNITION MECHANISM

FIELD

Embodiments described herein generally relate to transportation. More particularly, embodiments relate to computing devices in transportation systems.

BACKGROUND

The various transportation industries have spent considerable resources devising solutions to prevent vehicle crashes attributable to driver impairment, such as driver fatigue, consumption of alcohol and drugs, etc. Nevertheless, no adequate solution exists despite the expenditures and years of research. Existing schemes are merely passive (e.g., using cameras and steering adjustment measurements to warn a driver that is deemed to be impaired). Such schemes are insufficient since they do not actively assist a driver to stay alert.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Embodiments may be embodied in systems, apparatuses, and methods for impairment recognition, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

Embodiments provide for an impairment recognition mechanism that includes a passive detect system and stimulus response mechanism. The passive detect system obtains an initial indication that a driver of an automobile may have some impairment or lack of alertness, while the stimulus response mechanism receives the initial indication and performs a game mode to confirm a level of impairment based on responses measured from the driver to specific stimuli. When impairment is indicated an indication is provided to the vehicle safety system, which may automatically bring the automobile to a safe stop and/or notify emergency responders.

Figure 1:
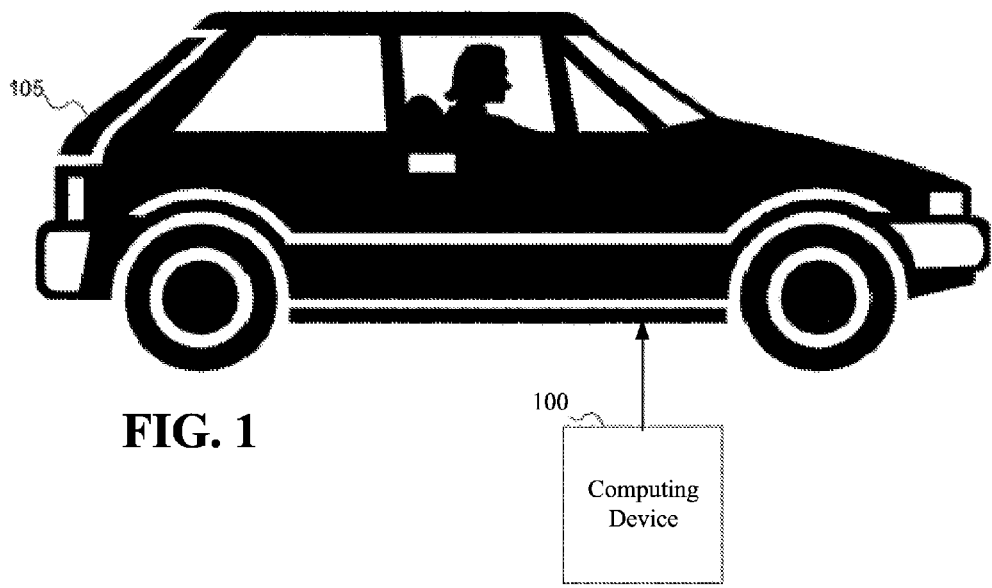
FIG. 1 illustrates one embodiment of an automobile having a computing device.

FIG. 1 illustrates one embodiment of an automobile 105. As shown in FIG. 1, automobile 105 includes a built-in (or on-board) computing device 100. Although disclosed as being an automobile, other embodiments may include any type of personal conveyance system having a built-in computer. For example, a boat or airplane may be implemented. For simplicity, however, remainder of this document will refer to the term "automobile" as intending to include all varieties of personal conveyances.

Figure 2:
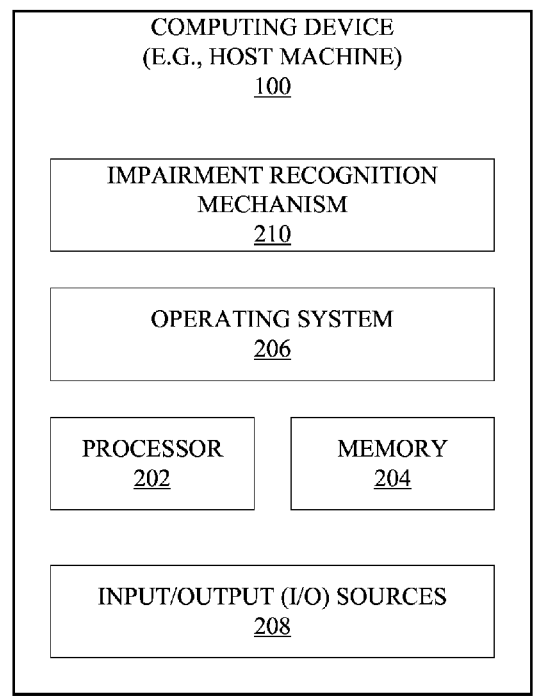
FIG. 2 illustrates an impairment recognition mechanism at a computing device according to one embodiment.

FIG. 2 illustrates an impairment recognition mechanism 210 at computing device 100 according to one embodiment. In one embodiment, computing device 100 serves as a host machine for hosting impairment recognition mechanism ("impairment mechanism") 210 that includes a combination of any number and type of components for measuring drowsy, distracted or impaired drivers at computing devices, such as computing device 100. In one embodiment, computing device 100 includes an on-board computer. Thus, implementation of impairment mechanism 210 results in computing device 100 being an automobile assistive device to determine a level of an automobile 105 user's impairment and assist the user in staying alert.

In other embodiments, impairment recognition operations may be performed at a computing device 100 including large computing systems, such as server computers, desktop computers, etc., and may further include set-top boxes (e.g., Internet-based cable television set-top boxes, etc.), global positioning system (GPS)-based devices, etc. Computing device 100 may include mobile computing devices, such as cellular phones including smartphones, personal digital assistants (PDAs), tablet computers, laptop computers (e.g., notebook, netbook, Ultrabook™, etc.), e-readers, etc.

Computing device 100 may include an operating system (OS) 206 serving as an interface between hardware and/or physical resources of the computer device 100 and a user. Computing device 100 may further include one or more processors 202, memory devices 204, network devices, drivers, or the like, as well as input/output (I/O) sources 208, such as touchscreens, touch panels, touch pads, virtual or regular keyboards, virtual or regular mice, etc.

Figure 3:
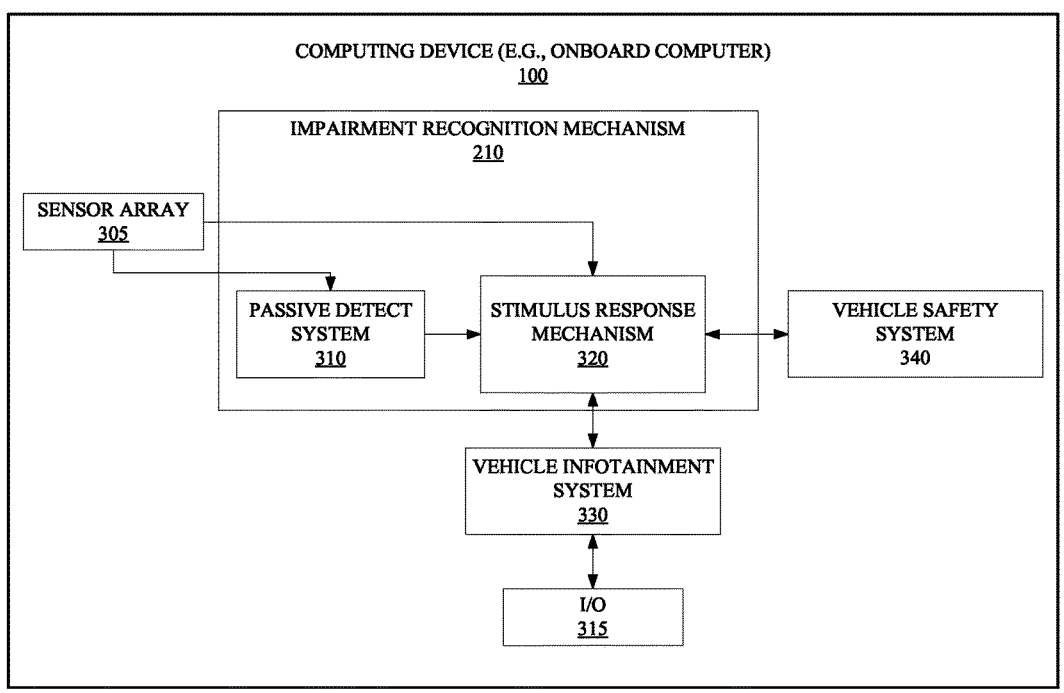
FIG. 3 illustrates one embodiment of an impairment recognition mechanism.

FIG. 3 illustrates an impairment recognition mechanism 210 employed at computing device 100. In one embodiment, impairment recognition mechanism 210 may include any number and type of components, such as passive detect system 310 and stimulus response mechanism 320. In embodiments, impairment recognition mechanism 210 receives input data from sensor array 305. In one embodiment, sensor array 305 includes one or more steering wheel movement sensors and accelerometers.

However in further embodiments, sensor array 305 may include an image capturing device, such as a camera. Such a device may include various components, such as (but are not limited to) an optics assembly, an image sensor, an image/video encoder, etc., that may be implemented in any combination of hardware and/or software. The optics assembly may include one or more optical devices (e.g., lenses, mirrors, etc.) to project an image within a field of view onto multiple sensor elements within the image sensor. In addition, the optics assembly may include one or more mechanisms to control the arrangement of these optical device(s). For example, such mechanisms may control focusing operations, aperture settings, exposure settings, zooming operations, shutter speed, effective focal length, etc. Embodiments, however, are not limited to these examples.

Sensory array 305 may further include one or more image sensors including an array of sensor elements where these elements may be complementary metal oxide semiconductor (CMOS) sensors, charge coupled devices (CCDs), or other suitable sensor element types. These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. Embodiments, however, are not limited to these examples. For example, an image sensor converts light received through optics assembly into pixel values, where each of these pixel values represents a particular light intensity at the corresponding sensor element. Although these pixel values have been described as digital, they may alternatively be analog. As described above, the image sensing device may include an image/video encoder to encode and/or compress pixel values. Various techniques, standards, and/or formats (e.g., Moving Picture Experts Group (MPEG), Joint Photographic Expert Group (JPEG), etc.) may be employed for this encoding and/or compression.

In a further embodiment, sensor array 305 may include other types of sensing components, such as context-aware sensors (e.g., myoelectric sensors, temperature sensors, facial expression and feature measurement sensors working with one or more cameras, environment sensors (such as to sense background colors, lights, etc.), biometric sensors (such as to detect fingerprints, facial points or features, etc.), capacitive touch and contact switches sensors to detect user touch (e.g., tapping of a steering wheel or switch), and the like. Although shown as being coupled to both passive detect system 310 and stimulus response mechanism 320, various array 305 sensors may be received at only one of passive detect system 310 and stimulus response mechanism 320. Further, embodiments may be implemented in which sensor array 305 is not a component of automobile 105.

In embodiments, impairment recognition mechanism 210 implements passive detect system 310 to obtain an initial indication that a driver may have some impairment or lack of alertness. In such an embodiment, passive detect system 310 receives data from sensor array 205, as well as analysis software to determine impairment. For instance, passive detect system 310 may receive images from a camera capturing the users face, eyes, gaze, and head movement; analysis of the slight turns of the steering wheel from steering wheel sensors and/or biological measurements (e.g., heartbeat, respiration, EMG (measurement of electrical activity of the muscular system), EEG (measurement of brain activity), etc.).

According to one embodiment, stimulus response mechanism 320 receives the initial indication from passive detect system 310 and confirms a level of impairment using one or more games. In this embodiment, each game implemented at stimulus response mechanism 320 is based on responses measured from the driver to specific stimuli provided by vehicle infotainment system 330, which is coupled to various input/output devices 330 (e.g., audio speakers and microphones) within automobile 105. In other embodiments, stimuli may be provided from another component, or directly from one or more of the I/O devices 330.

According to one embodiment, stimulus response mechanism 320 uses the driver game responses to compute a game score. Subsequently, the game score is analyzed to determine whether the driver is impaired. In one embodiment, impairment is indicated when driver responses fall outside a set of pre-determined allowed limits. In one embodiment, a determined impairment indication is provided to vehicle safety system 340. In such an embodiment, vehicle safety system 340 may automatically bring automobile 105 to a safe stop and/or notify emergency responders. In other embodiments, stimulus response mechanism 320 may store the game scores for future use (e.g., insurance purposes).

Figure 4:
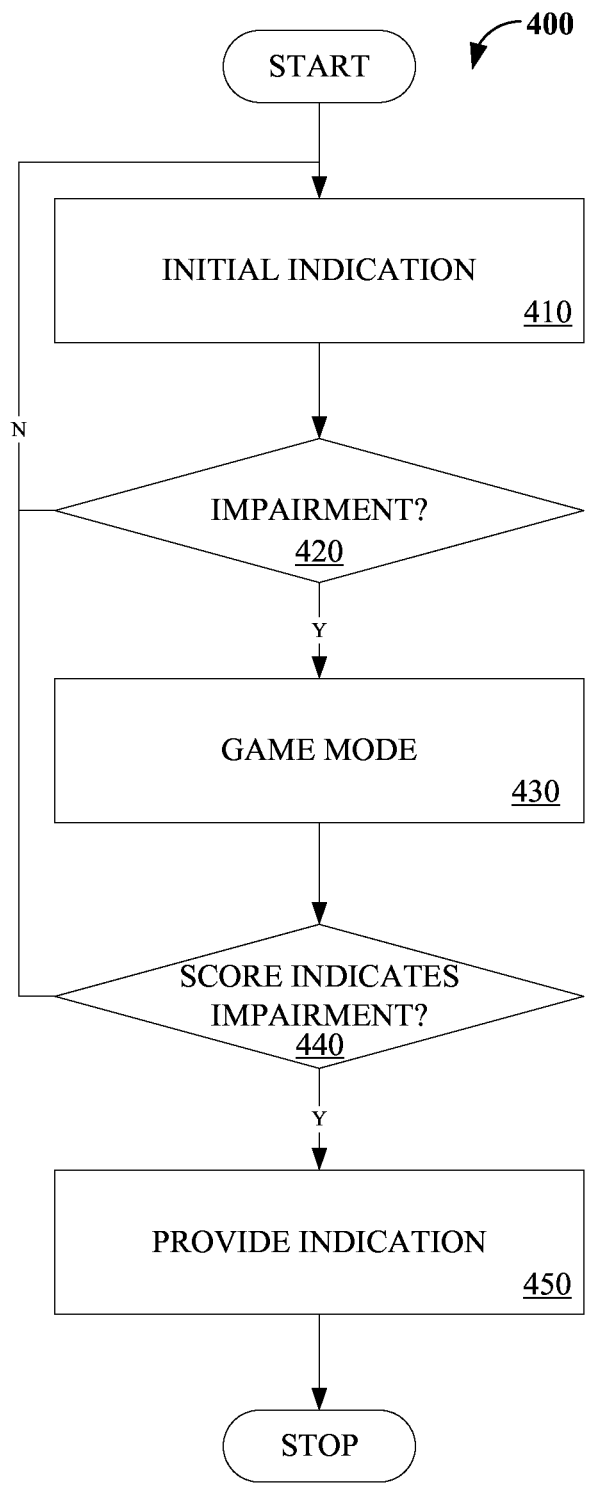
FIG. 4 is a flow diagram illustrating one embodiment of an impairment recognition process.

FIG. 4 is a flow diagram illustrating one embodiment of an impairment recognition process 400 performed by impairment recognition mechanism 210. Process 400 may be performed by processing logic that may comprise hardware (e.g., circuitry, dedicated logic, programmable logic, etc.), software (such as instructions run on a processing device), or a combination thereof. The methods of process 400 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-3 are not discussed or repeated here.

At processing block 410, passive detect system 310 performs an initial determination of driver impairment. As discussed above, initial impairment may be determined based on images received from a camera, analysis of slight turns of the steering wheel and/or biological measurements. At decision block 420, the initial determination is made as to whether the user is impaired. If not, control is returned to processing block 410 for a subsequent determination of driver impairment.

If an initial impairment is detected at decision block 420, stimulus response mechanism 320 enters a game mode. As discussed above, stimulus response mechanism 320 includes one or more games that provide a stimulus to the driver and measures the driver's response to the games. Thus, in the game mode stimulus response mechanism 320 provides the driver with one or more games and calculates a score for each game performed. In one embodiment, the games are intended to have minimal interference with driving. For example, the games do not require the driver to look at any specific point inside the car or to remove hands from the steering wheel. In a further embodiment, impairment recognition mechanism may switch between games after a pre-determined amount of time.

According to one embodiment, each game involves activities by different regions of the brain are (e.g., movement, cognitive, spatial, auditory, speech, etc.). Exemplary games include Beat Tap, Tap or Squeeze, Button Press and Subsequent Letter/Number. For the Beat Tap game, vehicle infotainment system 330 plays one of several songs that has a well-defined beat. The driver uses a hand to tap the beat on the steering wheel or use a foot to tap the beat on the foot plate. In one embodiment, the score relates to how closely the user's taps match the beat of the song.

For the Tap or Squeeze game, vehicle infotainment system 330 quizzes the driver to tap (or squeeze) the steering wheel with either the left or right hand (e.g., via a direct prompt—"tap with your right", or in response to a side (left or right speaker) audio message. In this embodiment, the score relates to the accuracy (correct hand tap/squeeze) and time delay.

The Button Press game is in response to a tone sequence in which vehicle infotainment system 330 plays a sequence of tones. If the sequence goes up in pitch, the driver is to press a "Volume Up" button on the steering wheel. However if the sequence goes down in pitch, the user is to press the "Volume Down" button on the steering wheel. In one embodiment, these presses do not actually effect the actual volume. The score relates to the time delay in pressing the button.

For the Subsequent Letter/Number game vehicle infotainment system 330 provides an audible letter of the alphabet (or a number) and the driver is to respond by speaking out with the subsequent letter or number. In this embodiment, the score relates to a time delay on the response and the clarity of the response. Although described with reference to the above-games, other embodiments may feature additional games. For instance, games may be tailored. In one embodiment, mechanism 110 may be initialized with biases for games. In such an embodiment, an avoid "squeeze game" for an elder person (or person with CTS), may be implemented (e.g., machine learning to recognize that user is normally slow to recognize music)

At decision block 440, a determination is made as to whether a computed game score indicates impairment. As discussed above, the determination may be made based on whether the score is below a pre-determined threshold score. However in other embodiments, a determination of impairment can be made based on whether the score is decreasing at a specific rate, or there is an atypical deviation between the scores from the different types of games (e.g. fast on movement, slow on analytical).

If the game score is above the threshold, control is returned to processing block 410 for a subsequent determination of initial driver impairment. However if the score falls below the threshold level score, an impairment indication is provided to vehicle safety system 340, processing block 450. In response, vehicle safety system 340 performs some action, For example vehicle safety system 340 may automobile 105 to a safe stop, provide additional stimulus to wake-up the driver, provide warnings to another person in automobile that can take over for the driver, provide warnings to other drivers (e.g., emergency lights, horn, etc.) or make an emergency dispatch call.

Another example includes blowing a mist with smell to raise alertness. Another example dispatches an ambulance upon detecting urgently critical conditions (e.g. stroke, heart attack, seizures) when impairment recognition mechanism 210 is initialized with the users risk factor. A driver may be jolted with electricity in yet another embodiment. Other examples may include poking a driver, turning emergency lights on, honking, alerting nearby vehicles through vehicle-to-vehicle communication and dispatching highway patrol.

Although described above with reference to transportation, other embodiments may apply to non-transportation fields. For instance, impairment recognition mechanism 210 may be implemented in applications in which a user is to maintain a presence at a desk or a post (e.g. security guards in a lobby, military, students studying in the night).

Figure 5:
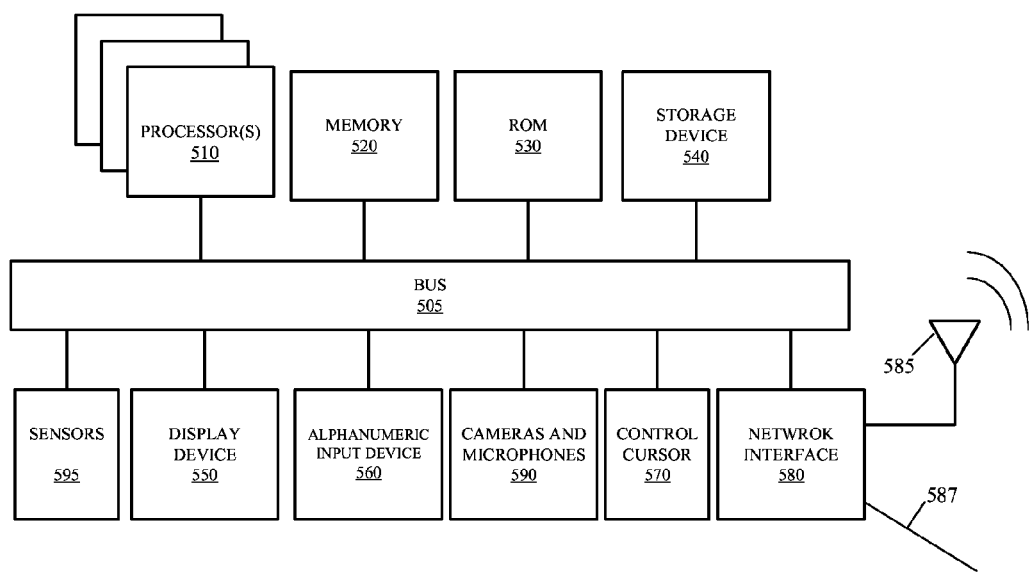
FIG. 5 illustrates one embodiment of a computer system.

FIG. 5 illustrates one embodiment of a computer system 500. Computing system 500 includes bus 505 (or, for example, a link, an interconnect, or another type of communication device or interface to communicate information) and processor 510 coupled to bus 505 that may process information. While computing system 500 is illustrated with a single processor, electronic system 500 and may include multiple processors and/or co-processors, such as one or more of central processors, graphics processors, and physics processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 1010.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe a driver, record audio and video and to receive and transmit visual and audio commands. Sensors 595 may also be coupled to bus 505 to provide sensory input data to computer system 500.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes An apparatus to impairment recognition a sensor array to acquire sensory data including a passive detect system to receive the sensory data and determine an indication of user impairment and stimulus response logic to receive the indication of user impairment, perform one or more games and determine a level of user impairment based on the user response to the one or more games.

Example 2 includes the subject matter of Example 1, further comprising an infotainment system to provide stimuli to the user during performance of the one or more games.

Example 3 includes the subject matter of Example 2, wherein the infotainment system is coupled to receive the stimuli from input/output (I/O) devices.

Example 4 includes the subject matter of Example 2, wherein the stimulus response logic measures the user response to stimuli provided by the infotainment system.

Example 5 includes the subject matter of Example 1, wherein the stimulus response logic computes a game score based on the user response.

Example 6 includes the subject matter of Example 5, wherein the game score is analyzed to determine user impairment.

Example 7 includes the subject matter of Example 6, wherein user impairment is determined whenever the game score falls below a pre-determined threshold.

Example 8 includes the subject matter of Example 6, wherein user impairment is determined based on a decrease of the game score at a specific rate.

Example 9 includes the subject matter of Example 6, wherein user impairment is determined based on atypical deviation between game scores from the one or more games.

Example 10 includes the subject matter of Example 6, further comprising a safety system to receive an impairment indication upon a determination of impairment at the stimulus response logic.

Example 11 includes the subject matter of Example 1, wherein the passive detect system receives user images as sensory data.

Example 12 includes the subject matter of Example 11, wherein the passive detect system further receives movement data as sensory data.

Some embodiments pertain to Example 13 that includes an impairment recognition method comprising receiving sensory data, determining an indication of initial user impairment based on the sensory data, providing one or more games to the user to determine a level of user impairment, calculating a game score based on user responses to the one or more games and providing an indication of impairment upon a determination that the game score indicates user impairment.

Example 14 includes the subject matter of Example 13, wherein user impairment is determined whenever the game score falls below a pre-determined threshold.

Example 15 includes the subject matter of Example 13, wherein user impairment is determined based on a decrease of the game score at a specific rate.

Example 16 includes the subject matter of Example 13, wherein user impairment is determined based on atypical deviation between game scores from the one or more games.

Example 17 includes the subject matter of Example 13, wherein the sensory data comprises user images.

Example 18 includes the subject matter of Example 17, wherein the sensory data further comprises movement data.

Some embodiments pertain to Example 19 that includes at least one machine-readable medium comprising a plurality of instructions that in response to being executed on a computing device, causes the computing device to carry out operations comprising receiving sensory data, determining an indication of initial user impairment based on the sensory data, providing one or more games to the user to determine a level of user impairment, calculating a game score based on user responses to the one or more games and providing an indication of impairment upon a determination that the game score indicates user impairment.

Example 20 includes the subject matter of Example 19, wherein user impairment is determined whenever the game score falls below a pre-determined threshold.

Example 21 includes the subject matter of Example 19, wherein user impairment is determined based on a decrease of the game score at a specific rate.

Example 22 includes the subject matter of Example 19, wherein user impairment is determined based on atypical deviation between game scores from the one or more games.

Some embodiments pertain to Example 23 that includes an automobile comprising a sensor array to acquire sensory data, an impairment recognition system including a passive detect system to receive the sensory data and determine an indication of user impairment and stimulus response logic to receive the indication of user impairment, perform one or more games and determine a level of user impairment based on the user response to the one or more games.

Example 24 includes the subject matter of Example 23, further comprising an infotainment system coupled to the impairment recognition system to provide stimuli to the user during performance of the one or more games.

Example 25 includes the subject matter of Example 24, further comprising a safety system to receive an impairment indication upon a determination of impairment at the stimulus response logic.

Some embodiments pertain to Example 26 that includes at least one machine-readable medium comprising a plurality of instructions that in response to being executed on a computing device, causes the computing device to carry out operations according to any of claims 13-18.

Some embodiments pertain to Example 27 that includes an apparatus to perform impairment recognition, comprising means for receiving sensory data, means for determining an indication of initial user impairment based on the sensory data, means for providing one or more games to the user to determine a level of user impairment, means for calculating a game score based on user responses to the one or more games and means for providing an indication of impairment upon a determination that the game score indicates user impairment.

Example 28 includes the subject matter of Example 27, wherein user impairment is determined whenever the game score falls below a pre-determined threshold.

Example 29 includes the subject matter of Example 27, wherein user impairment is determined based on a decrease of the game score at a specific rate.

Example 30 includes the subject matter of Example 27, wherein user impairment is determined based on atypical deviation between game scores from the one or more games.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus to impairment recognition, comprising:
a sensor array to acquire sensory data;
a passive detect system to receive the sensory data and determine an indication of user impairment; and
stimulus response logic to receive the indication of user impairment, perform one or more games, determine a level of user impairment based on the user response to the one or more games and compute a game score that is analyzed to determine user impairment based on the user response, wherein user impairment is determined based on a decrease of the game score at a specific rate.

2. The apparatus of claim 1 further comprising a system to provide stimuli to the user during performance of the one or more games.

3. The apparatus of claim 2 wherein the system comprises an infotainment system is coupled to receive the stimuli from input/output (I/O) devices.

4. The apparatus of claim 2 wherein the stimulus response logic measures the user response to stimuli provided by the system.

5. The apparatus of claim 1 wherein user impairment is further determined whenever the game score falls below a pre-determined threshold.

6. The apparatus of claim 1 wherein user impairment is further determined based on a decrease of the game score at a specific rate.

7. The apparatus of claim 1 wherein user impairment is further determined based on atypical deviation between game scores from the one or more games.

8. The apparatus of claim 1 further comprising a safety system to receive an impairment indication upon a determination of impairment at the stimulus response logic.

9. The apparatus of claim 1 wherein the passive detect system receives user images as sensory data.

10. The apparatus of claim 9 wherein the passive detect system further receives movement data as sensory data.

11. An impairment recognition method comprising:
receiving sensory data;
determining an indication of initial user impairment based on the sensory data, providing one or more games to the user to determine a level of user impairment;
calculating a game score based on user responses to the one or more games; and
providing an indication of impairment upon a determination that the game score indicates user impairment, wherein user impairment is determined based on a decrease of the game score at a specific rate.

12. The method of claim 11 wherein user impairment is determined whenever the game score falls below a pre-determined threshold.

13. The method of claim 11 wherein user impairment is further determined based on atypical deviation between game scores from the one or more games.

14. The method of claim 11 wherein the sensory data comprises user images.

15. The method of claim 14 wherein the sensory data further comprises movement data.

16. At least one non-transitory machine-readable medium comprising a plurality of instructions that in response to being executed on a computing device, causes the computing device to carry out operations comprising:
receiving sensory data;
determining an indication of initial user impairment based on the sensory data;
providing one or more games to the user to determine a level of user impairment;
calculating a game score based on user responses to the one or more games; and
providing an indication of impairment upon a determination that the game score indicates user impairment, wherein user impairment is determined based on a decrease of the game score at a specific rate.

17. The at least one machine-readable medium of claim 16, wherein user impairment is determined whenever the game score falls below a pre-determined threshold.

18. The at least one machine-readable medium of claim 16, wherein user impairment is determined based on atypical deviation between game scores from the one or more games.

19. An automobile comprising:
a sensor array to acquire sensory data;
an impairment recognition system including;
a passive detect system to receive the sensory data and determine an indication of user impairment; and
stimulus response logic to receive the indication of user impairment, perform one or more games, determine a level of user impairment based on the user response to the one or more games and compute a game score that is analyzed to determine user impairment based on the user response, wherein user impairment is determined based on a decrease of the game score at a specific rate.

20. The automobile of claim 19 further comprising an infotainment system coupled to the impairment recognition system to provide stimuli to the user during performance of the one or more games.

21. The automobile of claim 20 further comprising a safety system to receive an impairment indication upon a determination of impairment at the stimulus response logic.

* * * * *